Patented May 30, 1950

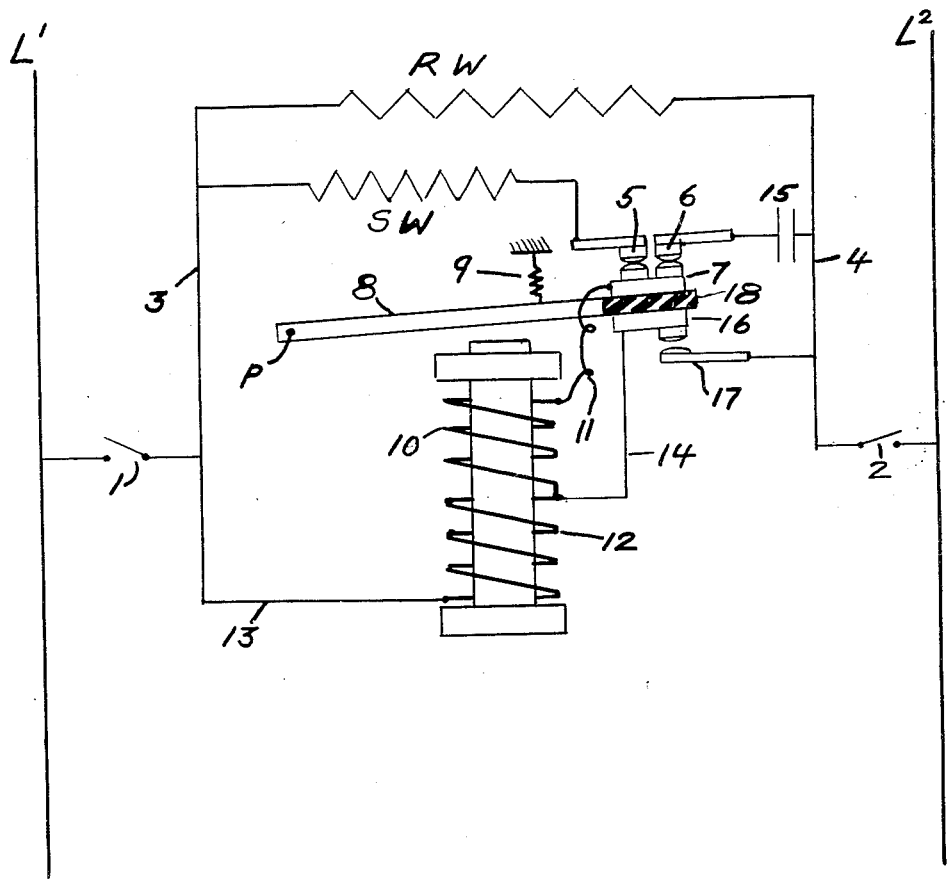

2,509,590

UNITED STATES PATENT OFFICE 2,509,590

APPARATUS FOR STARTING SINGLE-PHASE CAPACITOR TYPE MOTORS

Paul T. Galt, Jr., West Hartford, Conn., assignor to The Arrow-Hart & Hegeman Electric Company, Hartford, Conn., a corporation of Connecticut Application June 24, 1948, Serial No. 34,990

11 Claims. (Cl. 318—221)

1

This invention relates to a circuit and apparatus for the starting of single-phase capacitor type motors.

Heretofore the most common methods for controlling the circuit during the starting of single phase capacitor-type motors have been by the use of a centrifugal switch or a voltage-responsive relay.

The centrifugal switch was located in the motor and opened as the speed of the rotor increased. If the speed decreased, however, the switch would close again. This reclosing caused burning of the contacts. Furthermore, because of the location of the centrifugal switch on the motor, replacement of such a switch was expensive. Also in the new so-called "pancake" motors there is no place for a centrifugal switch.

Another common method used in starting single-phase capacitor motors has required the use of a voltage-responsive relay in the construction of which the aim was to have the relay actuate when the voltage was approximately 140% of the imposed line voltage. The aim in the construction of such voltage-responsive relays was also to have the relay "drop-out" only when the voltage had dropped to 70% of the imposed line voltage. These objectives were exceedingly difficult, and in practice, were impossible to meet under present-day production requirements with the arrangements and relay structures heretofore used. Hence, the relay responded poorly or not at all at the desired voltage because the coil was asked to operate the relay only at a figure twice that of the holding power. Often the relay would close too soon because the hold-in value was so low that the relay would respond before a sufficient voltage had been induced to permit the motor to continue running. Furthermore, at the critical voltages the relay would chatter; the contacts would wear out because the relay would reclose when the motor slowed down due to a highpeak load; and inductive reaction through the capacitor would cause the relay to operate several times after the power was cut off to stop the motor.

Whereas the prior arrangements offered solutions to the problems by a compromising of the ultimate aims, the present invention approaches the problem from the viewpoint that the starting-winding be not re-encircuited by the re-closure of any switch under any conditions of practical operation until the power is shut off. In other words, the present invention avoids the difficulties and disadvantages of the prior arrangements by giving full recognition to the fact that it is un-

2 desirable and harmful to re-close a switch to re-encircuit the starting-winding after it has once been cut out, until the power is shut off.

The objects and advantages of my invention will become apparent as it is described in connection with the accompanying drawing.

The drawing illustrates diagrammatically the circuit arrangement and the necessary elements of an electromagnetically-operated switching device or relay embodying the principles of the invention.

Referring to the drawing, the power lines L1 and L2 feed current to the apparatus through starting switches 1 and 2. These switches 1 and 2 may be of conventional form, and although separately illustrated for convenience in the drawing, may have their blades connected together for simultaneous operation as is common in the art. The running-winding RW and the starting-winding SW are connected together at one end and to the starting switch 1 by a conductor 3. The opposite end of the running-winding is connected by a conductor 4 to the starting switch 2. The opposite end of the starting-winding is connected to one of the stationary contacts of a relay or electromagnetically-operated switch whose essential elements and structure will now be described.

The electromagnetic switch or relay device comprises a pair of separate stationary contacts 5 and 6 which are adapted normally to be engaged by a common movable contact 7 mounted upon an armature 8. A spring 9, one end of which is fastened to a fixed point and the other to the armature serves to bias the armature and contact 7 carried thereby into engagement with the fixed contacts 5 and 6. The armature is pivoted about a fixed pivot p. In order to attract the armature, an electromagnetic solenoid coil is provided, having two parts 10 and 12 of different values connected in series. One end of the electromagnet coil is connected by a conductor 11 to the movable contact 7. The other end of the coil is connected by a conductor 13 to the starting switch 1 and through that switch to the power line L1. At an intermediate point in the electromagnet coil—i. e., at the connection between its parts 10 and 12—a connection is made by a conductor 14 to a movable contact 16 carried by the armature 8 in insulated relation to the movable contact 7. The contact 16 is engageable with a fixed contact 17 when the armature is attracted. Contact 17 is connected with the conductor 4 and through the starting switch to the power line L2. The mounting of the movable contacts 7 and 16 upon the armature 8 may be accomplished in any suitable fashion. Merely for the purpose of illustration, an insulating block 18 is illustrated upon which these contacts may be mounted and which in turn may be mounted upon the armature 8.

The parts 10 and 12 of the electro-magnet coil are so designed that when both parts are energized, the armature 8 will be attracted or in other words the device will be responsive at 140% of the normal line voltage. The part 12 is so designed that when it alone is energized, it will hold the already-attracted armature when only 70% of the normal line voltage is passing through that part 12.

Because only part 12 of the coil is used for holding, it can be accurately designed to hold down to 70% of normal voltage; and because both parts of the coil are used to actuate the armature and break the starting connection, the part 10 can be so designed in relation to part 12 as to give great accuracy or response to 140% of normal voltage. Hence, the difficulties in design of prior arrangements are avoided and overcome.

From the foregoing the operation of the arrangement may be understood. When the starting switches 1 and 2 are closed, the current may pass from the line L1 to the starting switch 2 and conductor 3 to both the starting and running-windings. The circuit will be completed through the running-winding by the conductor 4 and starting switch 2 to the other line L2. The circuit through the starting-winding will be completed by passage of current through the starting-winding to the stationary contact 5, movable contact 7, stationary contact 6, capacitor 15, conductor 4, starting switch 2 to the line L2. Current will also pass through both parts of the electro-magnet coil from L1 by the conductor 13 connecting with one end of the part 12; and by the conductor 11 connected with the opposite end of the part 10 and to the contact 7, from whence the path of the current will thereafter be through fixed contact 6, capacitor 15, conductor 4, starting switch 2 to line L2.

When the voltage through the parts 10 and 12 of the electromagnet coil reaches 140% of normal line voltage, the armature 8 will be attracted thereupon causing the contact 7 to separate from the stationary contacts 5 and 6 it being obvious that the connection between 5 and 6 are thereby also disconnected. At the same time the movable contact 16 will engage the stationary contact 17. The disengagement of the movable contact 7 from the fixed contacts 5 and 6 breaks the circuit through the starting-winding SW. The disengagement of contacts 5, 6 and 7 also disconnects or breaks the circuit through the part 10 of the electromagnet coil. The engagement of contacts 16 and 17 will continue in circuit the part 12 of the electromagnet coil, the current entering through conductor 13 and leaving through conductor 14 which now is connected to the power line L2 through the contacts 16 and 17 and starting switch 2. Since the part 12 is designed to hold the armature attracted until the voltage through it drops below 70% of normal line voltage, the motor will keep running so long as the voltage through the coil is 70% of normal line voltage.

From the foregoing it will be observed that by an extremely simple form of relay and circuit arrangement, the invention provides for the cutting out of the starting-winding very accurately at the time that the voltage reaches 140% of normal line voltage. The invention also provides equal accuracy in maintaining of the running connections until the voltage has dropped to 70% of the normal line voltage.

These advantages of accuracy of upper and lower limits are accomplished at the same time that other disadvantages of prior arrangements are avoided—namely, the avoidance of re-encircuiting of the starting-winding, chattering of the relay, excessive wear of the contacts and too-soon or too-late actuation of the relay.

It is apparent that the number and arrangement of contacts need not be as diagrammatically illustrated since by adding another stationary contact normally engaged with the movable contact 7 and connecting it to the coil part 10, the movable contact 7 need not have a permanent conductor affixed thereto. Also, by adding a fixed contact (engageable by the movable contact 16 when contact 16 engages fixed contact 17) and connecting it to the junction of the coil parts 10 and 12, no permanent flexible connection is needed to the movable contact 16.

These and other modifications within the scope of my invention will occur to those skilled in the art. Therefore the invention is not limited to the specific arrangement illustrated.

What I claim is:

1. In combination with power lines, a motor having starting-windings and running-windings, an electromagnetically-operated switching device comprising first fixed contact means, first movable contact means normally engaged with said fixed contact means, second fixed contact means, second movable contact means engageable with said second fixed contact means, electromagnetic coil means connectible in parallel with said starting-winding, means electrically connecting said coil means to said first fixed and movable contact means while they are engaged, means electrically connecting a portion of said coil means to said second fixed and movable contact means while they are engaged, means connecting said coil means and said running-winding and said starting-winding to one power line, a capacitor connected to said starting-winding when said first fixed and movable contact means are engaged, and means connecting said second fixed contact means and said capacitor and said running-winding to another power line.

2. The combination claimed in claim 1 wherein the coil means has two parts which when both are energized will actuate said first movable contact means to separate from said first fixed contact means at a predetermined over-voltage, one part of said coil means being effective to hold said movable contact means in actuated position until a predetermined under-voltage is reached.

3. The combination as claimed in claim 2 having means to cause said first fixed and movable contact means to separate when said second fixed and movable contacts engage, and vice versa.

4. The combination as claimed in claim 3 wherein the electromagnetic device has an armature on which the movable contacts are mounted.

5. In a combination with power lines, a motor having a running-winding, a capacitor, a starting-winding adapted to be connected in series with said capacitor, electromagnetically operated switching means normally closed and connecting said starting-winding and capacitor to power lines, said electromagnetically-operated switching means being activated on a predetermined over-voltage to open said normally closed switching means, contact means normally open but closed upon said over-voltage activation of said switching means, coil means for operating said electromagnetic switching means, and maintained in current-carrying condition by said switching means when the latter is closed, a portion of said coil means being encircuited with the power lines by said contact means when said switching means opens and means causing said switching means to open when said contact means closes and vice versa.

6. The combination as claimed in claim 5 wherein said portion of the said coil means maintains said contact means closed until a predetermined under-voltage value is reached.

7. The combination as claimed in claim 6 wherein the electromagnetic device has an armature on which the movable contacts of said contact means and of said switching means are mounted.

8. In combination with power lines, a motor having starting and running windings, a capacitor and an electromagnetic relay, said relay having two cooperating coil parts, an armature operated by said coil parts, said relay having first contacting means for connecting said coil parts together in parallel with said starting-winding, and in series with said capacitor during the starting of the motor, said relay having second contacting means for connecting only one of said coil parts across the power lines when said motor is running nomally, said armature being attractable by said coil to operate said contact means.

9. The combination claimed in claim 8 wherein said one coil part holds said armature in attracted position until a predetermined under-voltage is reached.

10. The combination claimed in claim 8 where both coil parts cooperating will attract said armature only when a predetermined over-voltage is reached.

11. The combination claimed in claim 10 and wherein said one coil part holds said armature in attracted position until a predetermined under-voltage is reached.

PAUL T. GALT, Jr.

REFERENCES CITED

The following references are of record in the file of this patent:

UNITED STATES PATENTS

| Number | Name | Date |
|---|---|---|
| 2,008,845 | Van Valkenburg | July 23, 1935 |
| 2,429,049 | Crozier | Oct. 14, 1947 |

FOREIGN PATENTS

| Number | Country | Date |
|---|---|---|
| 630,915 | Germany | June 9, 1936 |